United States Patent [19]

Larsen

[11] Patent Number: 5,052,983

[45] Date of Patent: Oct. 1, 1991

[54] BELT GUIDE ANCHOR

[75] Inventor: Glenn T. Larsen, Bloomington, Minn.

[73] Assignee: The Toro Company, Minneapolis, Minn.

[21] Appl. No.: 580,339

[22] Filed: Sep. 10, 1990

[51] Int. Cl.[5] ............................................. F16H 7/18
[52] U.S. Cl. ................................................... 474/140
[58] Field of Search ...................... 474/140, 42, 131; 292/306; 248/71-73, 74.5; 403/93-95, 100-102

[56] References Cited

U.S. PATENT DOCUMENTS

| 134,309 | 12/1872 | Pinnell | 474/140 |
|---|---|---|---|
| 1,271,717 | 7/1918 | Kaufmann | 474/140 |
| 1,280,682 | 10/1918 | Dickinson | 474/140 |
| 1,281,850 | 10/1918 | Schenberger | 474/140 |
| 1,704,532 | 4/1923 | Curtis | 474/140 |
| 2,820,656 | 3/1954 | Jensen | 403/399 |
| 4,807,417 | 2/1989 | Bell | 248/71 |

OTHER PUBLICATIONS

Transmission and Linkage Assembly Parts Sheet from the Toro Parts Catalog, form number 3313-820, Copyright 1989.

Primary Examiner—Ramon S. Britts
Assistant Examiner—Roger J. Schoeppel
Attorney, Agent, or Firm—R. Lawrence Buckley

[57] ABSTRACT

A drive belt guide for a drive belt system. A preferred drive belt guide assembly (41) includes a member (48) with means for accepting a fastener (52) wherein the fastener accepting means (49) establishes a pivot point for member (48), and wherein the member includes an elongate finger (93) projecting away from the pivot point and adjacent to a drive belt. The drive belt guide assembly (41) also includes an anchor (50) with means for accepting a fastener (52) wherein the fastener accepting means (57) establishes a pivot point for the anchor (50), and wherein the anchor (50) includes sharp protrusions (51) and (53) spaced away from the pivot point, and wherein the anchor (50), includes means for restraining the member (48) from rotational displacement. The drive belt guide assembly (41) also includes a fastening means (52) (54) for clamping the anchor (50) and the member (48) to the mounting surface (55) whereby the member (48) and the anchor (50) will remain adjacent to a drive belt once the member (48) and the anchor (50) are fastened to the mounting surface (55).

15 Claims, 6 Drawing Sheets

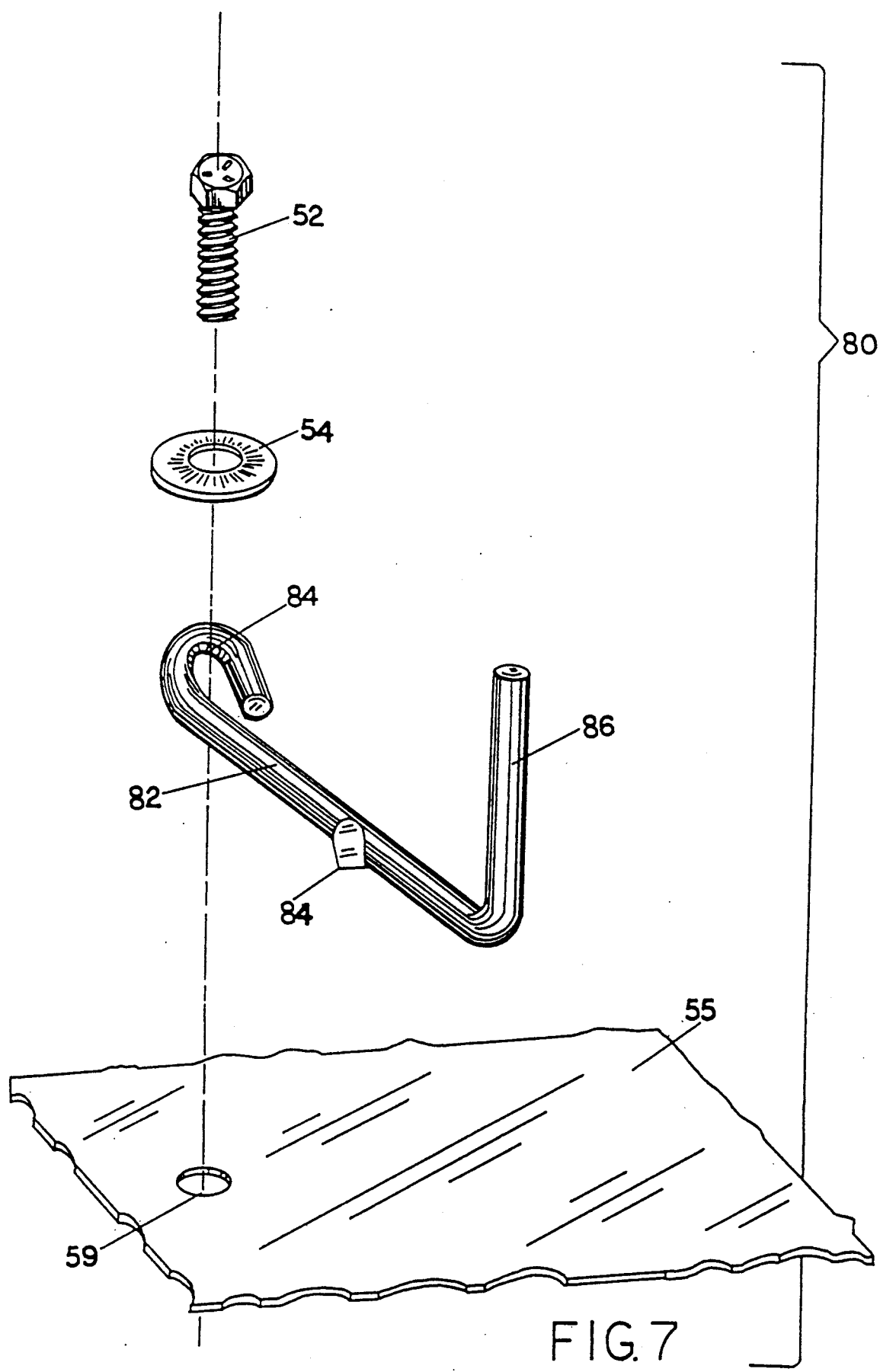

BELT GUIDE ANCHOR

TECHNICAL FIELD

The present invention relates generally to drive belt mechanisms and more particularly to a means for guiding and restraining drive belts on outdoor power equipment incorporating an idler drive belt engagement apparatus.

BACKGROUND OF THE INVENTION

As well known to those skilled in the art, drive belt assemblies incorporate two or more pulleys, one driving, two or more driven, wherein the system includes a drive belt to transmit power from the driving to the driven pulleys. It is often desirable to have a drive belt configuration wherein the drive belt may be disengaged from the power transmission mode by releasing belt tension applied to the belt by a movable idler pulley. One of the major problems presented in such an arrangement arises when the idler pulley releases belt tension. At such time, it is necessary to retain the belt in very close proximity to the driving pulley, which is still rotating usually at a high speed, and the driven pulleys so that the belt can be accurately reengaged for power transmission at any time by the operator through movement of the idler system. Retention of the belt in such close proximity is typically accomplished by placement of belt guides which allow the belt to relax off of the driving pulley, stopping power transmission even though the driving pulley continues to rotate at a high speed, but restrains the belt so as to keep the belt from falling too far away from the pulley system. The belt guides also keep the belt restrained in a proper shape so that the belt is held just far enough away from the driving pulley and cannot engage the rotating surface of the driving pulley at a time when no power transmission is desired.

Drive belt guides are also utilized in drive belt configurations where no idler system is used. In such configurations, the drive belt guide's sole function is to restrain and guide the belt during the power transmission mode, i.e., when the belt is engaged and is being driven.

In all cases, accurate placement and fastening of the drive belt guides is important so that the drive belt will be properly restrained as outlined above.

But, proper locating fastening and orientation retention of drive belt guides has been a longstanding problem. Historically the guides were constructed of round steel bar stock and were formed at one end so as to create an eye hook opening for accepting a fastener such as a bolt for clamping the belt guide to an adjacent mounting surface. The belt guide, as formed had no sharp protrusions on its clamping surface. Typically the installer of the driver belt guide had a great deal of difficulty in maintaining the proper belt drive guide orientation while tightening down the clamping bolt. As the bolt was tightened to its final turn it tended to grab the belt guide and rotate it away from the desired orientation of the guide. This forced the installer to force the guide back to its correct orientation after tightening by pounding the guide against the clamping force of the bolt. The installer was also often forced to attempt to hold the guide, during tightening, in its proper location, which was rather difficult. The installer would also often try to compensate for the anticipated unwanted rotational displacement by setting the initial orientation of the belt guide a number of degrees counter clockwise before tightening, hoping that the final location, after tightening the bolt, would be proper.

Even after the belt guide had been properly located and tightened, the belt guide of the prior design was still prone to harmful movement due to shock and vibrational loads in the machine. Furthermore, the drive belt itself would, from time to time contact the belt guide causing varying degrees of movement.

U.S. Pat. No. 1,280,682, issued to F. B. Dickinson, discloses a belt guide which incorporates a washer-clamp that has a set of protrusions which are used to prevent rotational displacement of a belt guide. However, the protrusions or tabs in the Dickinson belt guide washer-clamp do not prevent rotational displacement by frictionally engaging an adjacent mounting surface. These protrusions are used to actually contact the arms of the guide itself and thus prevent rotational displacement in that fashion. The Dickinson belt guide washer-clamp further attempts to prevent rotational displacement by utilizing a single tab on the washer that can be bent up against the flats of the bolt head of the bolt used to attach the guide and washer to the apparatus. While the Dickinson belt drive washer-clamp provides a means for preventing rotational displacement of the belt guide, it must be noted that the Dickinson clamp requires an additional forming step upon installation.

Another prior design utilized a single piece belt guide formed of a length of cold drawn steel round bar stock. The length of bar stock was formed so as to have an eyelet at one end for accepting a fastener and a finger like projection at the other end extending adjacent to a drive belt. The eyelet of the guide was formed so as to provide a suitable mounting surface so that the guide would mount flush on an adjacent mounting surface to which the guide was clamped when a bolt and nut combination was inserted and tightened down through the eyelet and mounting surface openings. This belt guide clamping technique did not eliminate the problem of the belt guide's tendency to move during the tightening of the fastener. The eyelet of the belt guide tended to be rotationally displaced by the torque applied to the fastener during tightening since the eyelet surface contacting the other adjacent mounting surface had a relatively low frictional resistance to the applied torque. The resulting rotational displacement caused the portion of the guide extending adjacent to the drive belt to be moved away from the desired position adjacent to the belt. The installer then was required to reset the position of the belt guide so that it would extend adjacent to the belt.

In addition to the prior art described above, there have been other belt guide techniques utilized. While each of these techniques were useful for their intended purposes, they each presented problems in that they typically did not prevent unwanted rotational displacement during the tightening process.

The present invention addresses the problems associated with prior art belt guide clamping techniques. In particular, a preferred drive belt guide according to the present invention accommodates ease of positioning and tightening the drive belt guide in a drive belt system in that it incorporates a member including means for accepting a fastener where the fastener accepting means establishes the pivot point for the member a sharp protrusion spaced away from the pivot point, and an elongate finger projecting away from the pivot point and from the protrusion and projecting adjacent to a drive belt. The drive belt system also incorporates fastening means for clamping the member to the mounting surface so as to frictionally engage the protrusion to the mounting surface, whereby the member will remain rotationally fixed relative to the pivot point and the finger of the member will remain adjacent to the drive belt once the member is fastened to the mounting surface.

SUMMARY OF THE INVENTION

Accordingly one embodiment of the present invention in a drive belt assembly including a plurality of pulleys, a mounting surface and a drive belt trained about the pulleys, includes a drive belt guide including: a member with a means for accepting a fastener wherein the fastener accepting means establishes a pivot point for the member, a sharp protrusion spaced away from the pivot point and an elongate finger projecting away from the pivot point and from the protrusion and projecting adjacent to the drive belt. The drive belt guide also includes a fastening means for clamping the member to the mounting surface so as to frictionally engage the protrusion with the mounting surface, whereby the member will remain rotationally fixed relative to the pivot point and the finger of the member will remain adjacent to the drive belt once the member is fastened to the mounting surface.

Another embodiment of the drive belt guide also includes an opening at the pivot point of the member for accepting the fastening means such as a bolt, nut and washer. Another embodiment of the drive belt guide includes a pair of sharp protrusions on the member spaced away from the pivot point, wherein the member is generally L-shaped and configured so as to form two separate portions adapted for simultaneously projecting adjacent to two different drive belts.

Another embodiment of the invention in a drive belt system including a plurality of pulleys a mounting surface, and a drive belt trained about the pulleys includes a drive belt guide including a member with means of accepting a fastener wherein the fastener accepting means establishes a pivot point for the member and an elongate finger projecting away from the pivot point and projecting adjacent to the drive belt. The drive belt guide also includes an anchor with means for accepting a fastener wherein the fastener accepting means establishes a pivot point for the anchor, a sharp protrusion spaced away from the pivot point, and means for restraining the member from rotational displacement. The drive belt guide also includes fastening means for clamping the anchor and the member to the mounting surface whereby the member and the anchor will remain rotationally fixed relative to the pivot point and the finger of the member will remain adjacent to the drive belt once the member and the anchor are fastened to the mounting surface. Another embodiment of the present invention includes an anchor of sheet metal formed in a channel-like cross section with a base and a pair of legs perpendicular to the base wherein the legs of the base include sharp protrusions spaced away from the pivot point. Another embodiment of the invention includes an anchor and a member that each include an opening at their pivot points for accepting a nut, bolt and washer fastener system. Another embodiment of the present invention includes a drive belt guide where the anchor is located between the head of the bolt and the member. Another embodiment of the present invention includes a drive belt guide where the member is located between the head of the bolt and the anchor. The invention will be further described with reference to the Drawing which is briefly described below.

BRIEF DESCRIPTION OF THE DRAWINGS

The invention will be further described with reference to the Drawings, wherein:

FIG. 7 is a perspective view of an alternative embodiment of the present invention depicting a belt guide anchor of an alternate configuration, a bolt, a washer and a mounting surface.

DETAILED DESCRIPTION OF PREFERRED EMBODIMENT

Figure 1:
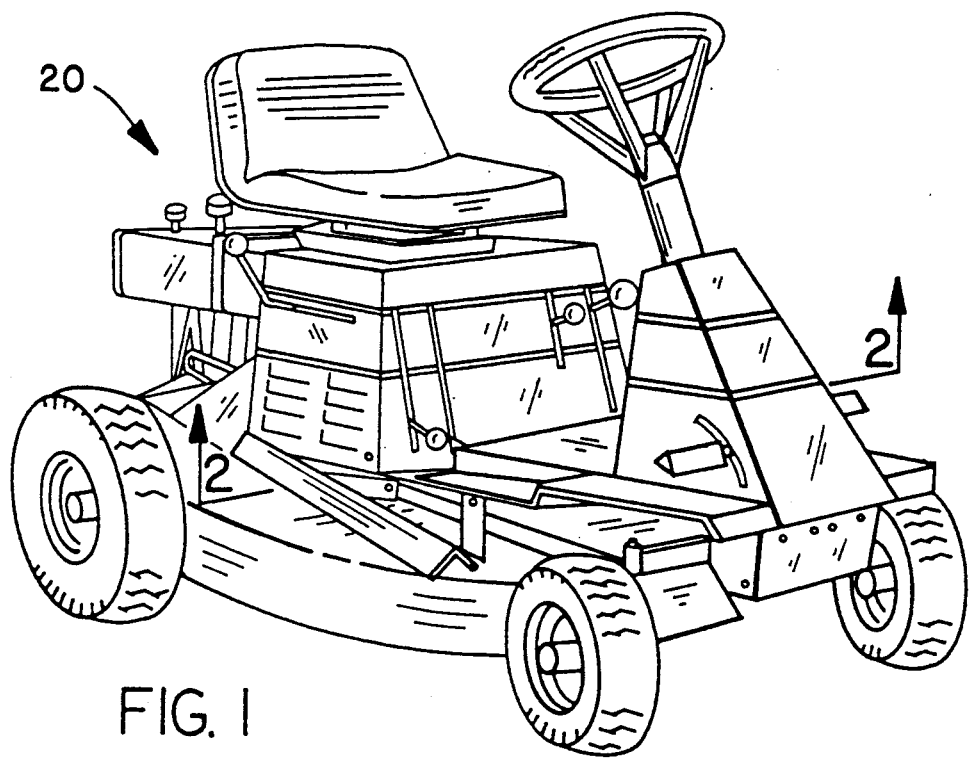
FIG. 1 is a perspective view of a typical outdoor power equipment unit such as a lawn tractor/riding mower.

A preferred embodiment of the invention including all of the various aspects of the invention, will now be described. With references to the drawing wherein like reference numerals designate like parts and assemblies throughout the several views. FIG. 1 shows a typical outdoor power equipment unit, 20, a riding lawn mower.

Figure 2:
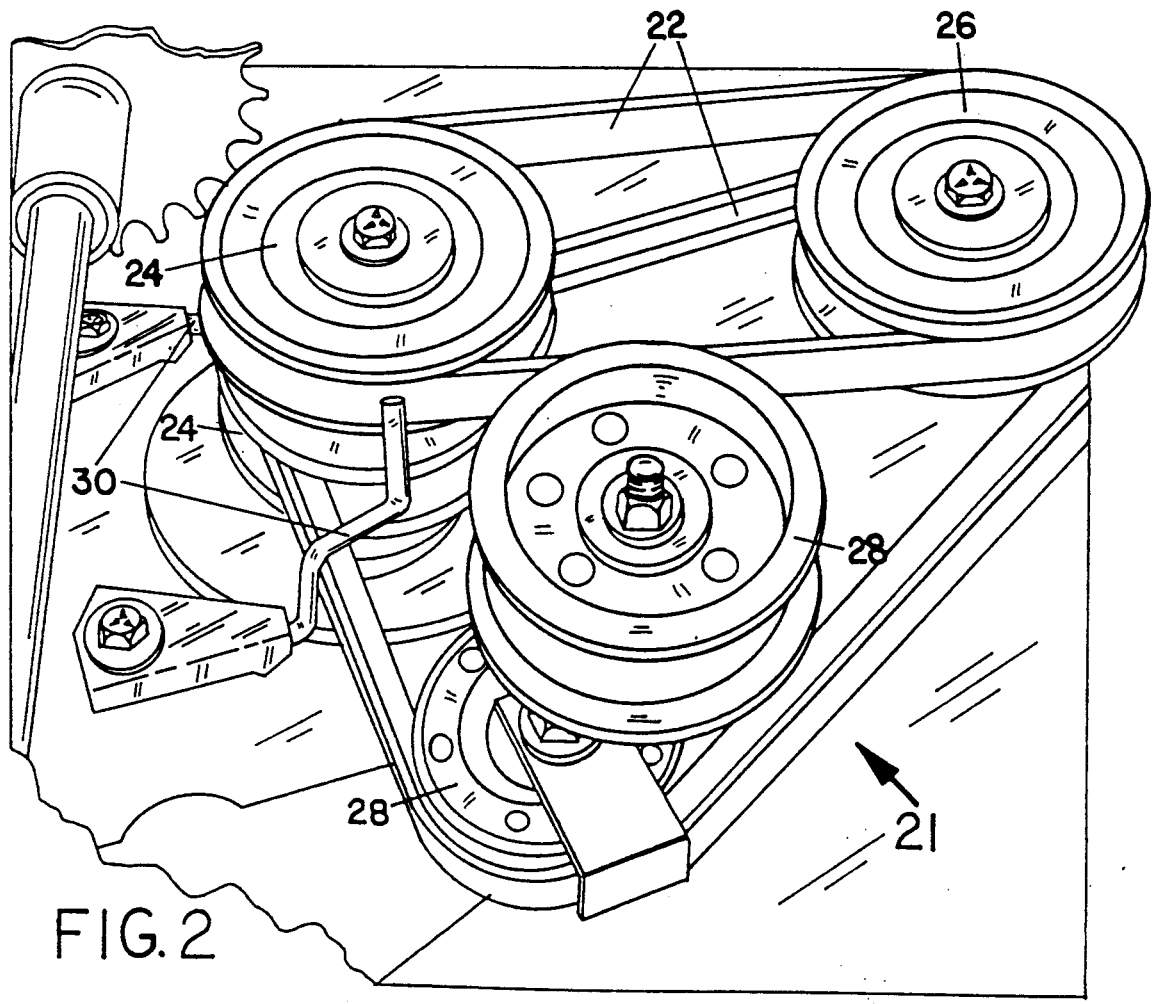
FIG. 2 is a perspective view of a typical outdoor power drive belt system incorporating two belt guides where the drive belts are engaged by an idler system pulley.
Figure 3:
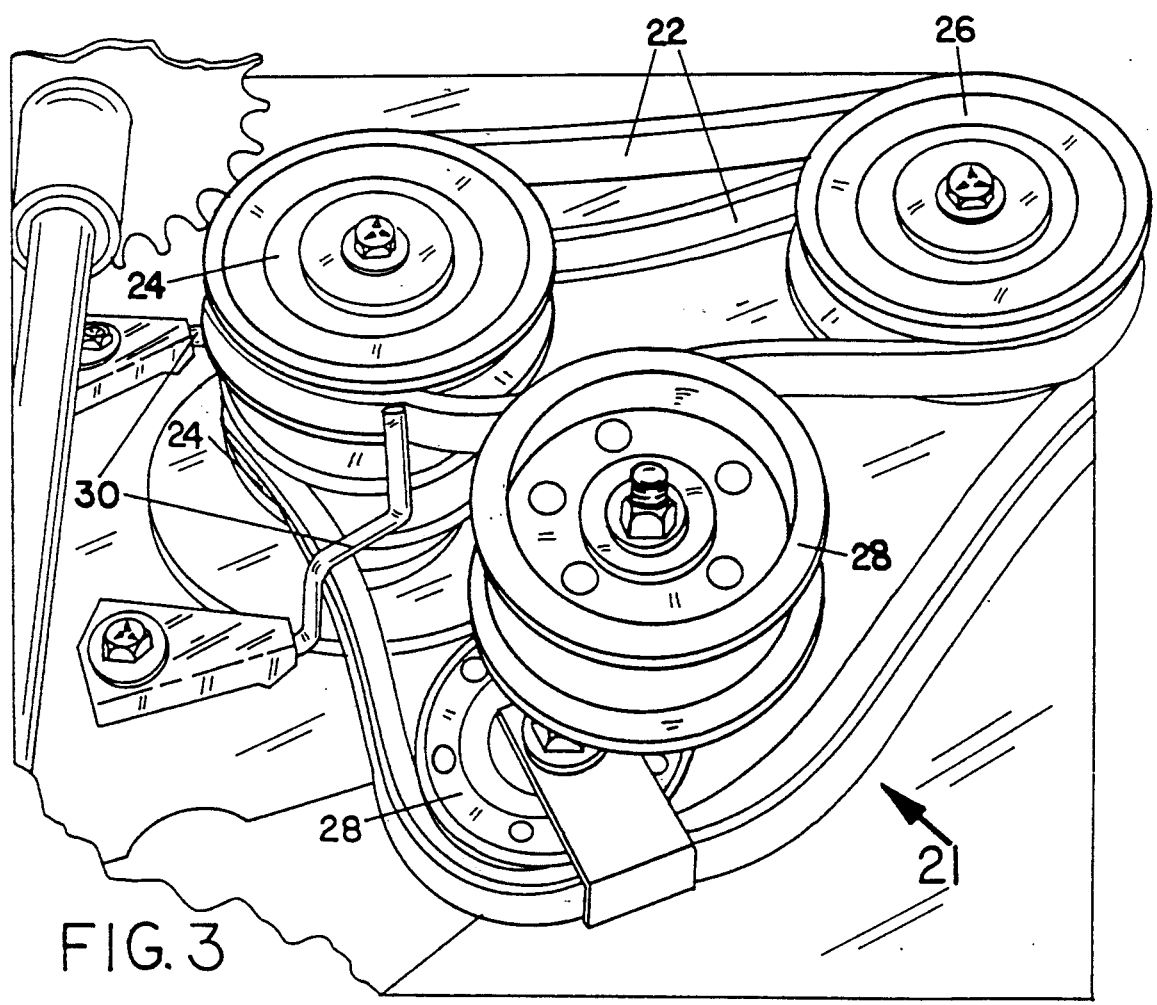
FIG. 3 is a perspective view of a typical outdoor power equipment belt drive system incorporating two belt guides where the drive belts are disengaged by an idler system pulley.

FIG. 2 shows a typical belt drive system utilized for mechanical power transmission on a typical outdoor power equipment unit 20 (see FIG. 1). Belt drive assembly 21 includes drive belts 22 which are driven by driving pulleys 24. The driving pulleys 24 transmit power to the driven pulleys 26 (only one driven pulley 26 is shown in FIGS. 2 and 3) when the idler pulleys 28 engage the drive belts 22 so as to create sufficient tension in the belts 22 which results in the belts gripping the driving pulleys 24 and the driven pulleys 26, resulting in power transmission through the belts. Drive belt guides 30 are positioned so as to restrain the drive belts 22 during the non-power transmission mode.

FIG. 3 shows the typical belt drive system utilized for mechanical power transmission on an outdoor power equipment unit 20 (see FIG. 1) where the belt drive system 21 is in the idling or non-power transmitting mode. Belt drive assembly 21 shows the idler pulleys 28 retracted from the drive belts 22. Drive belts 22 have excess slack in them so that the release of belt tension by the idler pulleys 28 causes belts 22 to drop away from driving pulleys 24 and driven pulleys 26, stopping power transmission. Belt guides 30 are positioned so as to prevent the slackened belt 30 from falling completely away from pulleys 24 and 26 or from becoming entangled in rotating driving pulley 24. Accurate placement and positive fastening of drive belt guides 30 are positioned so that guides 30 may properly engage and contain the slackened belts 22.

Figure 4:
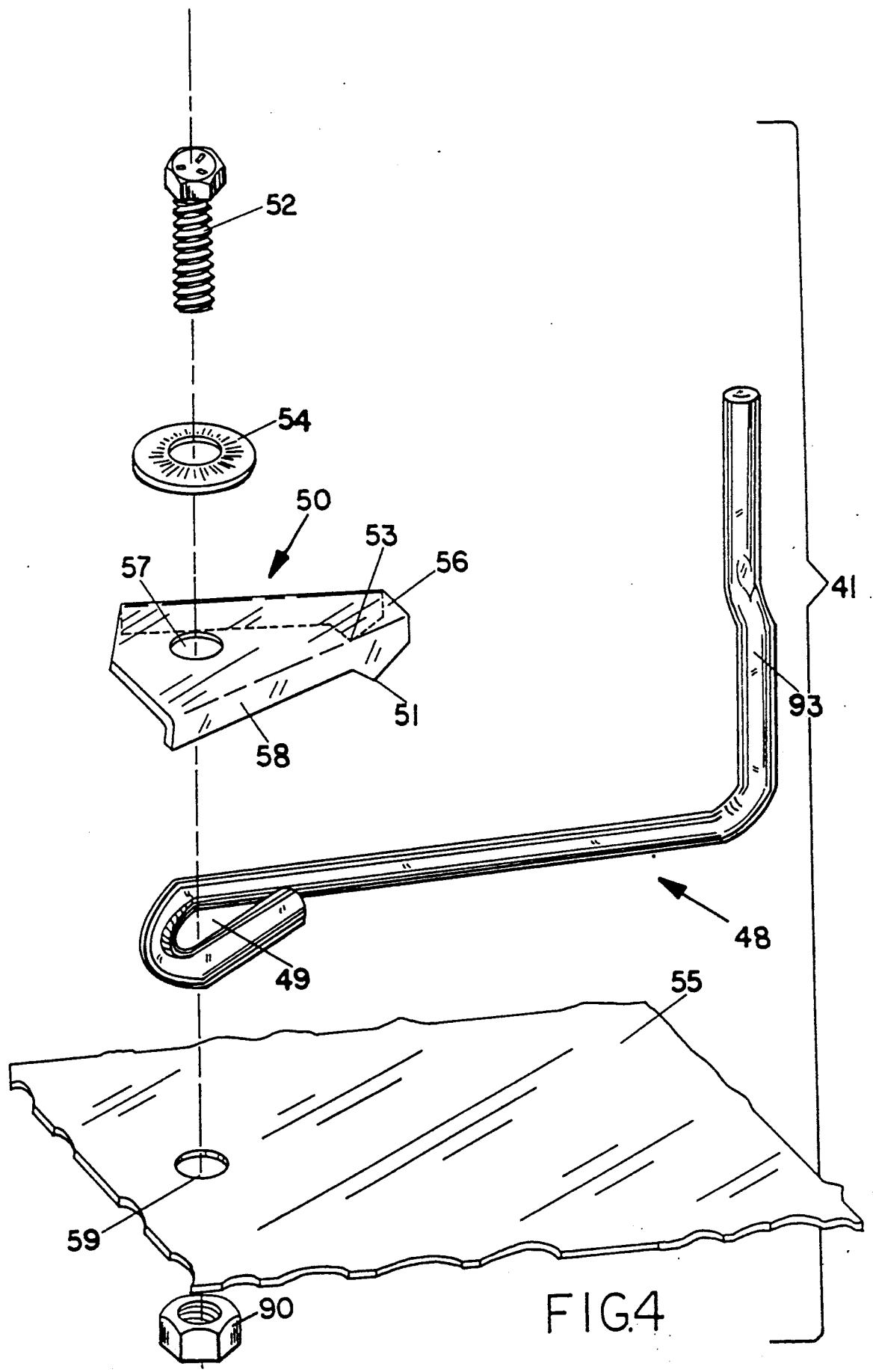
FIG. 4 is a perspective view of a typical outdoor power belt drive system depicting one embodiment of the present invention, including a drive belt guide, a drive belt anchor, a bolt, a washer and a mounting surface.

FIG. 4 is an exploded view of a drive belt guide assembly 41. The drive belt guide assembly 41 includes a drive belt guide member 48 which is fixed in proper position by a drive belt guide anchor 50. The drive belt guide anchor 50 is clamped to a mounting surface 55 by a bolt 52 and a washer 54 and a nut 90. The anchor 50, constructed in a preferred embodiment of 16 gauge cold rolled sheet steel which grips the mounting surface 55 at points 53 and 51 which project down from the base of the anchor and along the legs 58 of the anchor 50 The bolt 52 is tightened into the mounting surface 55, developing a large amount of down pressure on the belt guide anchor 50, forcing the points 51 and 53 into the mounting surface 55 creating indentations in the mounting surface 55. The engagement of the points 51 and 53 into the indentations on the mounting surface 55 raises the coefficient of friction between the contact points 51 and 53 and the mounting surface 55, which has the effect of further preventing undesirable rotational displacement of the belt guide 48 and anchor 50 The distances between points 51 and the bolt hole 57 and between points 53 and the bolt hole 57 are lever arms which tend to increase the effect that the frictional force developed at points 51 and 53 has in countering the moment created by the tightening of the bolt 52. In one particular outdoor power equipment drive belt system, it has been determined that a lever arm of 1.31 inches between the pivot point at hole 57 and point 51, as well as the lever arm between hole 57 to point 53, is optimal. The length of the lever arm will, of course, vary in belt guide assemblies that are larger or smaller to match larger or smaller drive belt systems.

FIG. 4 also shows the anchor 50 to be tapered down and away from the bolt hole 57 wherein the anchor 50 tapers down to the point where the anchor 52 embraces the belt guide member 48 at point 56, thus restraining the guide member 48. FIG. 4 also shows the anchor 50 to be of generally channel-like cross-section.

The belt guide 50 of the present invention has been shown to raise the restraining effect of belt guide member 48 by a considerable factor. For example in one configuration where the belt guide member 48 is formed of 0.25" diameter steel bar stock and also having a length of 4.25 inches from the center of the eyelet-opening 49, for accepting the bolt 52, to the vertical portion 93 of the guide member 48, the belt guide anchor 50 restrained the belt guide member 48 an full bolt 52 torque (200 in-lbs.) so as to enable the belt guide member 48 to withstand a force of 30 lbs. applied to the vertical portion 93 of the belt guide before rotational displacement of the belt guide member 48 and anchor 50 occurred. The belt guide member 48, restrained by the bolt 52, tightened to 200 in-lbs. of torque, but without the use of the belt guide anchor 50, was only capable of withstanding a force applied to the vertical portion 93 of the belt guide member 48 of 11 lbs. before rotational displacement of the belt guide member 48 occurred. At lesser bolt 52 torques, such as 100 in-lbs., a torque encountered during the positioning and tightening of the belt guide member 48, the belt guide member 48, restrained by the anchor 50, was able to withstand a force of 14 lbs. before rotational displacement of the belt guide member 48 occurred while the belt guide member 48 restrained only by the bolt 52 without the anchor 50 only withstood a force of 9 lbs. before rotational displacement of the belt guide member 48 occurred. From this, it is clear that the belt guide anchor 50 provides greater resistance to rotational displacement of the belt guide member 48 than the belt guide member 48 can provide by itself without the restraining effect of the anchor 50.

Figure 5:
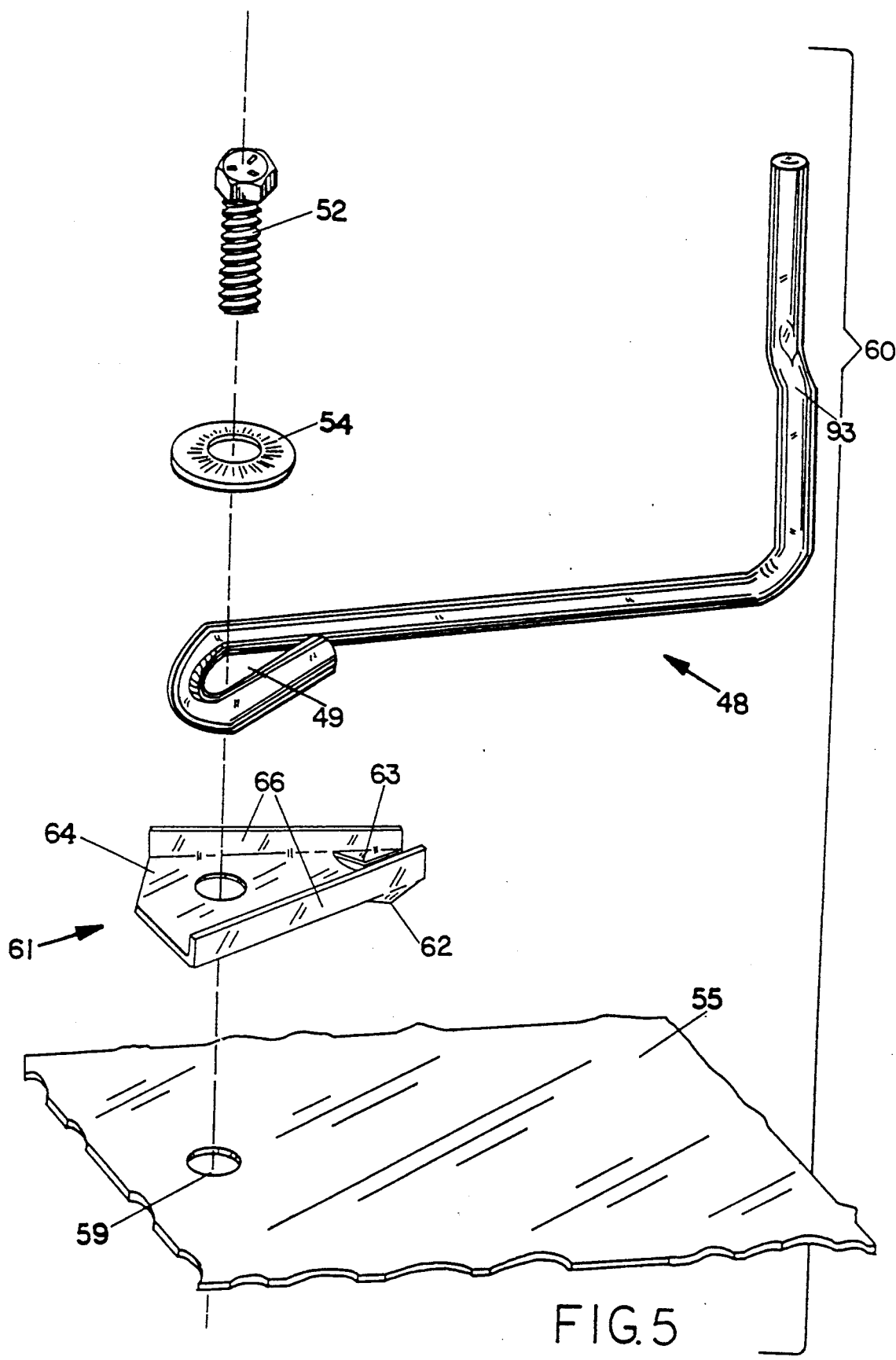
FIG. 5 is a perspective view of an alternative embodiment of the present invention, including a belt guide, a belt guide anchor of an alternate configuration, a bolt, a washer and a mounting surface.

FIG. 5 shows an exploded view of a belt guide anchor assembly 60 of alternative configuration wherein the sharp points 62 and 63 of the anchor 61 are configured so as to protrude down and away from the anchor legs 66 and perpendicularly away from the base 64 of the anchor. This permits installation of a belt guide member 48 wherein a bolt 52 and a washer 54 can be installed so that the bolt 52 and washer 54 directly engage the belt guide member 48.

Figure 6:
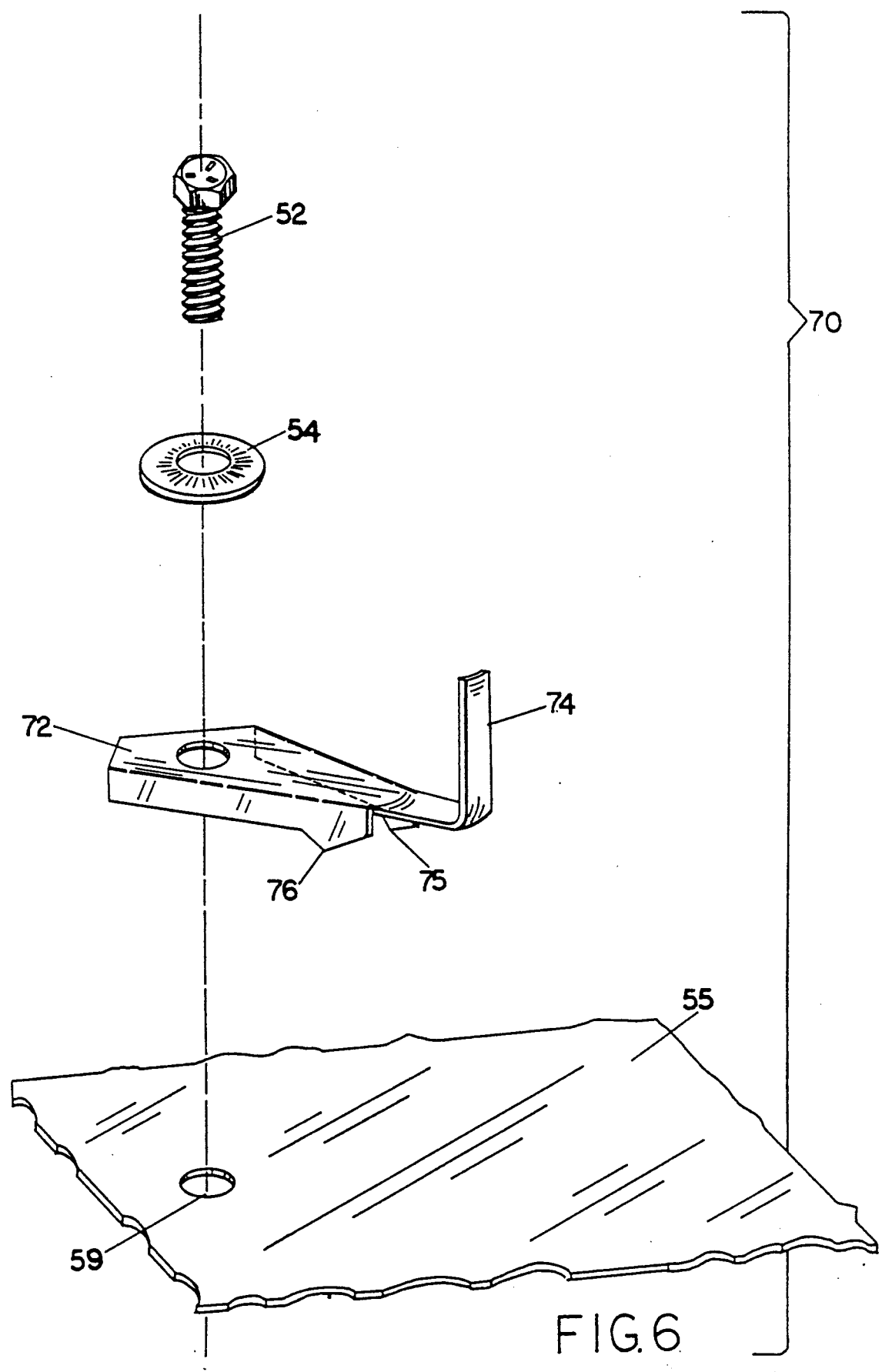
FIG. 6 is a perspective view of an alternative embodiment of the present invention depicting a belt guide anchor of an alternative configuration, a bolt, a washer and a mounting surface.

FIG. 6 shows an alternative embodiment wherein a belt guide assembly 70 includes a belt guide anchor 72 that is configured as one sheet metal member so as to incorporate a belt guide tab or extension 74 that has the same function as the belt guide member 48 shown in FIGS. 4 and 5. The assembly shown in FIG. 6 includes a bolt 52 and a washer 54 for clamping the anchor 72 to the mounting surface 55. The anchor 72 also includes sharp points at 75 and 76 which engage the mounting surface 55 by creating indentations in the surface 55 due to the downward clamping force created by the bolt 52 and washer 54.

FIG. 7 shows an alternative embodiment wherein a belt guide assembly 80 includes a belt guide 82 including one round solid material bar stock member configured so as to include one or more sharp protrusions 84 and one end configured so as to form an eye 84 for accepting a bolt 52 and a washer 54 for clamping guide 82 to a mounting surface 55. The guide 82 also includes a vertical portion 86 configured so as to project adjacent to an outdoor power equipment drive belt.

A preferred embodiment and alternative embodiments are described above. Those skilled in the art will recognize that many embodiments are possible within the scope of the invention. Variations and modifications of the various parts and assemblies can certainly be made and still fall within the invention. For example, one could utilize another means of fastening the anchor 50 and the belt guide member 48 to the mounting surface 55, such as a rivet. One could also modify the shape, dimensions and configuration of the anchor 50 and belt guide member 48 while still maintaining the desirable general mechanical advantages of the system disclosed above. Thus, the invention is limited only to the apparatus recited in the following claims and equivalence thereto.

I claim:

1. In a drive belt system including a plurality of pulleys a mounting surface, and a drive belt trained about said pulleys, a drive belt guide comprising;
   (a) a member comprising means for accepting a fastener wherein said fastener accepting means establishes a pivot point for said member, a sharp protrusion spaced away from said pivot point, and an elongate finger projecting away from said pivot point and said protrusion and projecting adjacent to said drive belt: and
   (b) fastening means for clamping said member to said mounting surface so as to frictionally engage said protrusion to said mounting surface, whereby said member will remain rotationally fixed relative to said pivot point and said finger of said member will remain adjacent to said drive belt once said member is fastened to said mounting surface.

2. The drive belt guide of claim 1 wherein said member comprises an opening at said pivot point for accepting said fastening means.

3. The drive belt guide of claim 1, wherein said fastening means comprises a bolt, a washer and a nut.

4. The drive belt guide of claim 1, wherein said member comprises a pair of sharp protrusions spaced away from said pivot point.

5. The drive belt guide of claim 1, wherein said member is generally L-shaped.

6. The drive belt guide of claim 1, wherein said member is configured so as to form two separate portions adapted for simultaneously projecting adjacent to two different drive belts.

7. In a drive belt system including a plurality of pulleys, a mounting surface, and a drive belt trained about said pulleys, a drive belt guide comprising;
  (a) a member comprising means for accepting a fastener wherein said fastener accepting means establishes a pivot point for said member, and an elongate finger projecting away from said pivot point and projecting adjacent to said drive belt;
  (b) an anchor comprising means for accepting said fastener wherein said fastener accepting means establishes a pivot point for said anchor, a sharp protrusion spaced away from said pivot point, and means for restraining said member from rotational displacement; and
  (c) fastening means for clamping said anchor and said member to said mounting surface whereby said member and said anchor will remain rotationally fixed relative to said pivot point and said finger of said member will remain adjacent to said drive belt once said member and said anchor are fastened to said mounting surface.

8. The drive belt guide of claim 7 wherein said fastening means comprises a bolt, a nut and a washer.

9. The drive belt guide of claim 7, wherein said anchor comprises sheet metal configured in a channel like cross section with a base and a pair of legs perpendicular to said base and wherein said legs of said base comprise sharp protrusions spaced away from said pivot point.

10. The drive belt guide of claim 7, wherein said means for accepting a fastener for said anchor comprises an opening at said pivot point of said member for accepting said bolt.

11. The drive belt guide of claim 7, wherein said means for accepting a fastener for said member comprises an opening at said pivot point of said member for accepting said bolt.

12. The drive belt guide of claim 7, wherein said member is generally L-shaped.

13. The drive belt guide of claim 7, wherein said member is configured so as to form two separate portions adapted for simultaneously projecting adjacent to two different drive belts.

14. The drive belt guide of claim 7, wherein said bolt comprises a head and said anchor is located between said head and said member.

15. The drive belt guide of claim 7, wherein said bolt comprises a head and said member is located between said head and said anchor.

* * * * *